(12) United States Patent
Glickman et al.

(10) Patent No.: US 10,309,610 B2
(45) Date of Patent: Jun. 4, 2019

(54) LIGHT APPARATUS WITH FILM LAYER TO BLEND WITH SURROUNDING BODY MEMBER

(71) Applicant: FORD GLOBAL TECHNOLOGIES, LLC, Dearborn, MI (US)

(72) Inventors: David Brian Glickman, Southfield, MI (US); Paul Kenneth Dellock, Northville, MI (US); Stuart C. Salter, White Lake, MI (US); James J. Surman, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 25 days.

(21) Appl. No.: 15/807,629

(22) Filed: Nov. 9, 2017

(65) Prior Publication Data

US 2019/0137069 A1    May 9, 2019

(51) Int. Cl.
| | | |
|---|---|---|
| *F21V 29/00* | (2015.01) | |
| *F21S 43/50* | (2018.01) | |
| *B60Q 1/34* | (2006.01) | |
| *F21S 45/47* | (2018.01) | |
| *F21S 43/14* | (2018.01) | |

(52) U.S. Cl.
CPC ............. *F21S 43/50* (2018.01); *B60Q 1/34* (2013.01); *F21S 45/47* (2018.01); *B60Q 2400/30* (2013.01); *F21S 43/14* (2018.01)

(58) Field of Classification Search
None
See application file for complete search history.

(56) References Cited

U.S. PATENT DOCUMENTS

| | | |
|---|---|---|
| 3,487,206 A | 12/1969 | Dawson et al. |
| 9,016,910 B2 | 4/2015 | Bingle |
| 9,688,034 B2 | 6/2017 | Ovenshire et al. |
| 2015/0022994 A1 | 1/2015 | Bingle |
| 2015/0167917 A1 | 6/2015 | Takahashi et al. |
| 2016/0288700 A1 | 10/2016 | Chen |

*Primary Examiner* — Vip Patel
(74) *Attorney, Agent, or Firm* — Carlson, Gaskey & Olds, P.C.

(57) ABSTRACT

A light apparatus, according to an exemplary aspect of the present disclosure includes, among other things, a light surrounded by a vehicle member, a film on a substrate layer to form a lens for the light, and a support comprising a first structure positioned behind the light and one portion of the lens and a second structure positioned behind a remaining portion of the lens. In one example, the light apparatus comprises a daytime running light and turn signal assembly. In one example, the apparatus and a method according to an exemplary aspect of the present disclosure includes, among other things, configuring a control to deactivate the light such that the assembly has a same appearance as the vehicle member.

20 Claims, 4 Drawing Sheets

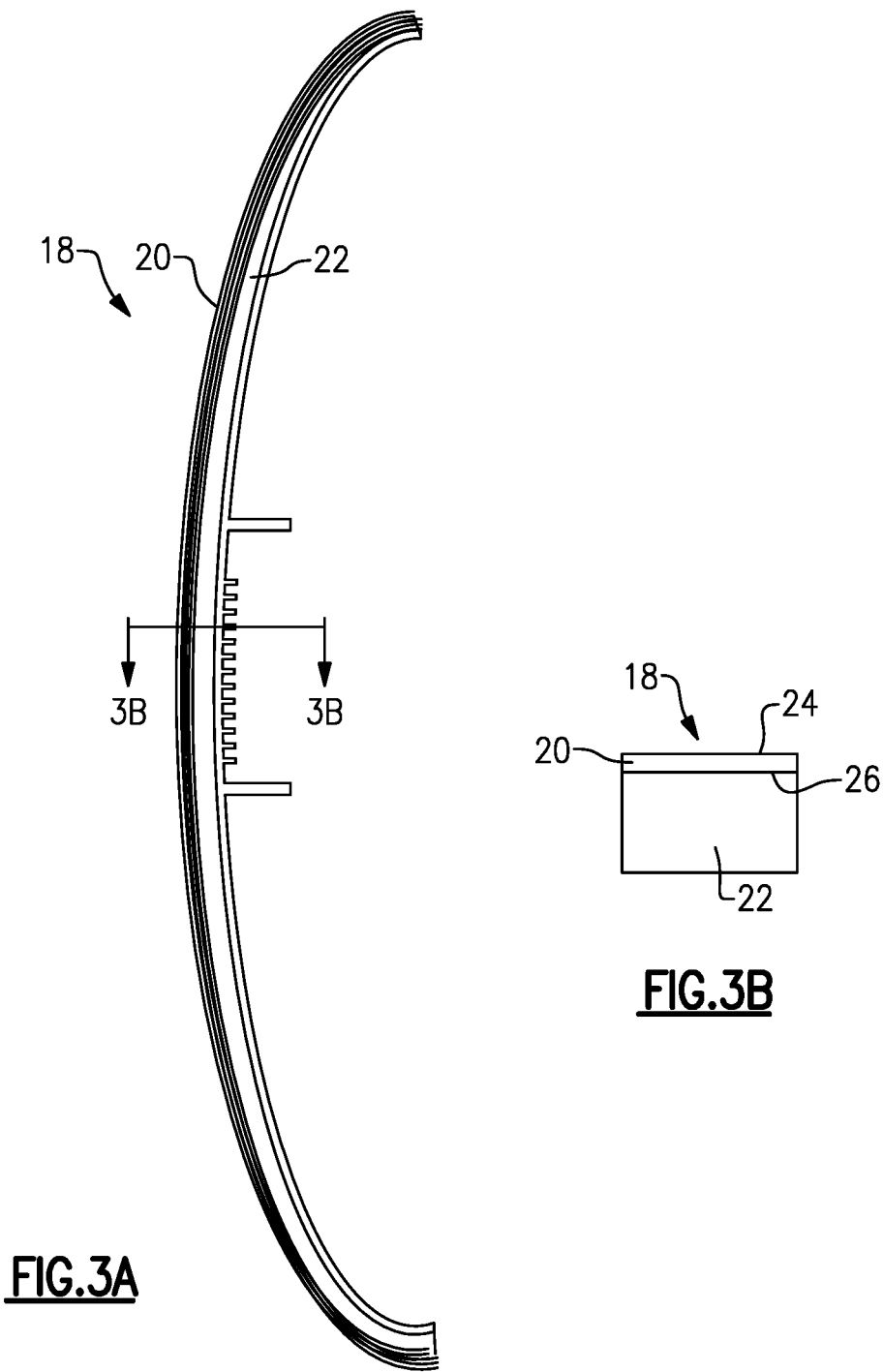

LIGHT APPARATUS WITH FILM LAYER TO BLEND WITH SURROUNDING BODY MEMBER

TECHNICAL FIELD

This disclosure relates to an exemplary apparatus and method of providing a light apparatus with a film covered lens for a light source and a control that can deactivate the light source such that the light apparatus blends in with a surrounding vehicle body member.

BACKGROUND

Current vehicles have various light assemblies that include, for example, turn signals and Daylight Running Lights (DRLs), which are designed into a front area of the vehicle. Vehicle stylists are continually attempting to use smaller lights to minimize the size and appearance of these light assemblies. Examples of smaller lights that have been used include High Intensity Discharge (HID) headlamps and Light Emitting Diode (LED) DRLs, for example. It is desirable to minimize the effects of these lights even more if possible to further improve styling options at the front area of the vehicle.

One solution to address this issue is to provide a DRL and turn signal lighting system that could be hidden by a moveable cover such that the lights would not appear on the front of the vehicle until needed. However, using mechanical covers adds cost and complexity to the vehicle. Further, the inclusion of additional components increases the potential for component failure. Other ways to minimize the lights without having to use additional components would further enhance the appearance of the vehicle.

SUMMARY

A light apparatus according to an exemplary aspect of the present disclosure includes, among other things: a light surrounded by a vehicle member; a film on a substrate layer to form a lens for the light; a support comprising a first structure positioned behind the light and one portion of the lens and a second structure positioned behind a remaining portion of the lens; and a control to deactivate the light such that the light apparatus has a same appearance as the vehicle member.

In a further non-limiting embodiment of the foregoing apparatus, the light comprises at least one of a daylight running light and a turn signal.

In a further non-limiting embodiment of either of the foregoing apparatus, the first structure is comprised of a first material and the second structure is comprised of a second material different than the first material.

In a further non-limiting embodiment of any of the foregoing apparatus, the first material has a first heat conductivity and the second material has a second heat conductivity that is different than the first heat conductivity.

In a further non-limiting embodiment of any of the foregoing apparatus, the first material comprises a first nylon plastic and the second material comprises a second nylon plastic different than the first nylon plastic.

In a further non-limiting embodiment of any of the foregoing apparatus, the vehicle member comprises a grille, bumper, or body panel having a first color, and wherein the film comprises a second color that matches the first color.

In a further non-limiting embodiment of any of the foregoing apparatus, the substrate layer comprises a clear plastic layer that is attached to an exterior or interior surface of the film.

In a further non-limiting embodiment of any of the foregoing apparatus, the clear plastic layer comprises at least one of polycarbonate, polypropylene, acrylic, and silicone.

In a further non-limiting embodiment of any of the foregoing apparatus, the light comprises one or more light sources connected to a circuit assembly that is supported by the first structure.

In a further non-limiting embodiment of any of the foregoing apparatus, the control is connected to the circuit assembly, and wherein the control activates the light source to be visible and deactivates the light source such that the light apparatus blends in with the vehicle member.

A light apparatus according to another exemplary aspect of the present disclosure includes, among other things: a daytime running light and turn signal assembly surrounded by a vehicle member, the assembly including lights, a film layer attached to a substrate layer to form a lens, and a structural support that supports the lens; and a control configured to deactivate the lights such that the assembly has a same appearance as the vehicle member.

In a further non-limiting embodiment of any of the foregoing apparatus, the vehicle member comprises a grille, bumper, or body panel having a first color, and wherein the film layer comprises a second color that matches the first color.

In a further non-limiting embodiment of any of the foregoing apparatus, the structural support comprises a first portion positioned behind the lights and one portion of the lens, and a second portion positioned behind a remaining portion of the lens.

In a further non-limiting embodiment of any of the foregoing apparatus, the first portion comprises a first plastic and the second portion comprises a second plastic different than the first plastic.

In a further non-limiting embodiment of any of the foregoing apparatus, the substrate layer comprises a clear plastic layer that is attached to an exterior or interior surface of the film layer.

In a further non-limiting embodiment of any of the foregoing apparatus, the lights are supported by the first portion, and wherein the control is configured to activate one or more of the lights to be visible in response to a turn signal request and/or during day time running light conditions.

A method according to an exemplary aspect of the present disclosure includes the steps of, among other things: providing a daytime running light and turn signal assembly surrounded by a vehicle member; activating the assembly to provide a desired lighting function; and deactivating the assembly such that the assembly has a same appearance as the vehicle member.

In a further non-limiting embodiment of the foregoing method, the assembly includes lights, a film layer attached to a substrate layer to form a lens, and a structural support to support the lens, and the method includes forming the vehicle member to have a first color and forming the film layer to have second color that matches the first color.

In a further non-limiting embodiment of either of the foregoing methods, the method includes forming the structural support to have at least a first portion to be positioned behind the lights and one portion of the lens, and a second portion to be positioned behind a remaining portion of the lens, and using a first plastic material for the first portion and a second plastic material different than the first plastic material for the second portion.

In a further non-limiting embodiment of any of the foregoing methods, the method includes using a two shot molding process to mold the first and second portions together to form the support structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3A is a schematic side view of a lens from the light apparatus of FIG. 2.

FIG. 3B is a section view of the lens of FIG. 3A.

DETAILED DESCRIPTION

This disclosure details exemplary apparatus and methods of providing a light apparatus with a film covered lens for a light source and a control that can deactivate the light source such that the light apparatus blends in with a surrounding vehicle body member. These and other features are discussed in greater detail in the following paragraphs of this detailed description.

Figure 1A:
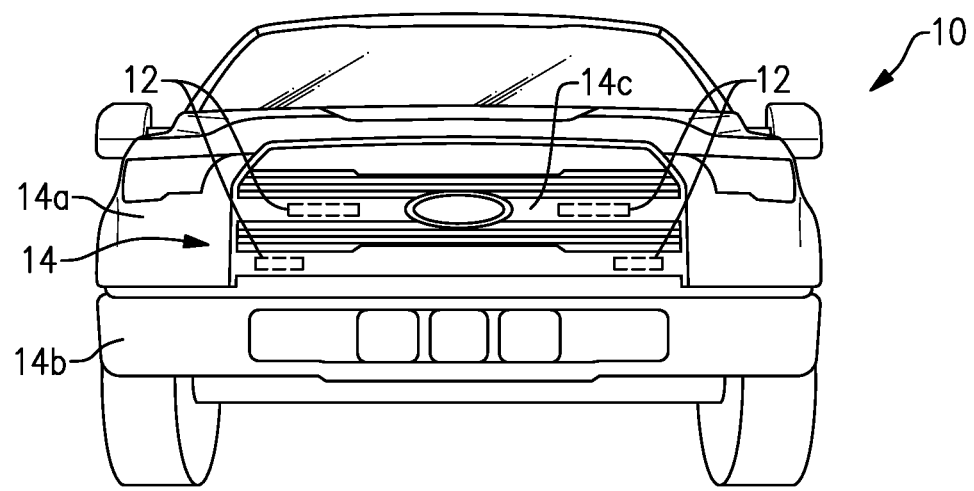
FIG. 1A is a schematic illustration of a vehicle including a light apparatus that incorporates the subject invention and which is in a "lights off" condition.
Figure 1B:
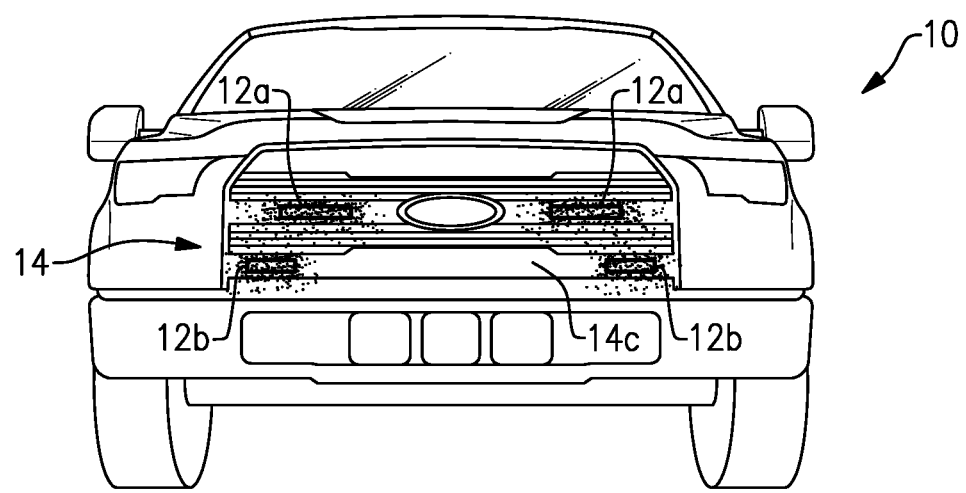
FIG. 1B is a view similar to FIG. 1A but in a "lights on" condition.

FIGS. 1A-B show a vehicle 10 that utilizes one or more light assemblies 12 that are incorporated into a vehicle body member 14 such as a body panel 14a, bumper 14b, grille 14c, etc. In the example shown in FIGS. 1A-B, the light assemblies 12 are integrated into a front grille 14c of the vehicle 10. FIG. 1A shows the light assemblies in a "lights off" condition, while FIG. 1B shows the light assemblies in a "lights on" condition.

In this example, the light assemblies 12 include one or more daylight running lights (DRLs) and turn signal lights. In the example shown in FIG. 1B, the vehicle 10 includes a pair of DRLs 12a in the front grille 14c and a pair of turn signal lights 12b positioned below the DRLs 12a. Each of these lights 12a, 12b are uniquely configured such that when in the "lights off" condition, the light assemblies 12 are not visible (FIG. 1A) when viewing the front of the vehicle 10, i.e. the light assemblies blend in with the surrounding vehicle body member 14 such that the body member 14 and light assemblies 12 have the same appearance.

Figure 2:
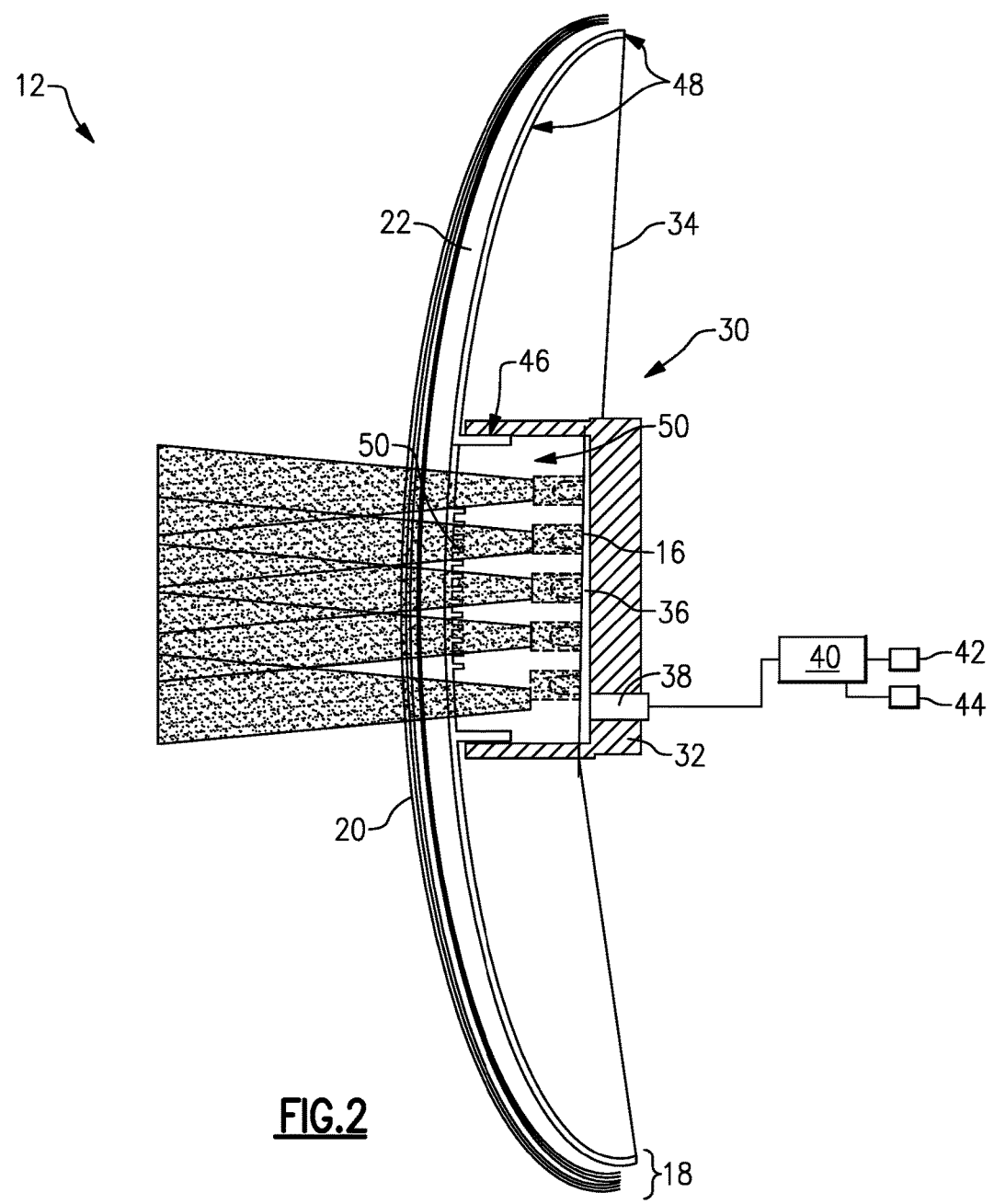
FIG. 2 is a schematic section view of a light apparatus as used in FIGS. 1A-B.

FIG. 2 shows one example of a light assembly 12 incorporating the subject invention. The light assembly 12 includes one or lights or light sources 16 and a lens 18 for the light sources 16. The lens 18 comprises at least a film layer 20 and a substrate layer 22 attached to the film layer 20. As shown in FIGS. 3A-3B, the film layer 20 includes an outward facing surface 24 that faces an external environment and an inward facing surface 26 that faces a vehicle interior environment. In the example shown in FIGS. 2 and 3A-B, the substrate layer 22 is attached to the inward facing surface 26 of the film layer 20. However, the substrate layer 22 could optionally be attached to the outward facing surface 24.

The light assembly 12 also includes a structural support 30 that comprises at least a first structure 32 positioned behind the light source 16 and an associated portion of the lens 18 and a second structure 34 positioned behind a remaining portion of the lens 18. In one example, a flexible printed circuit board (PCB) assembly 36 is connected to the light source 16 and includes a connector 38 to connect the PCB assembly 36 to a control 40. The control 40 is configured to deactivate the light source 16 such that when the light assembly 12 is in the "lights off" condition, the light assembly 12 blends in with the surrounding vehicle body member 14.

The system can also include one or more sensors, such as a day/night sensor 42 for example, that can be linked to the control 40 such that the control 40 will be able to determine when to activate the DRLs 12a. A turn signal indicator 44 can also be linked to the control 40 to communicate which turn signal light to activate in response to a driver input.

The control 40 can be a dedicated control unit or be incorporated into an already existing vehicle control unit, and can include a processor, memory, and one or more input and/or output (I/O) device interface(s) that are communicatively coupled via a local interface. The local interface can include, for example but not limited to, one or more buses and/or other wired or wireless connections. The control 40 may be a hardware device for executing software, particularly software stored in memory that may include one or more separate programs, each of which includes an ordered listing of executable instructions for implementing logical functions. The control 40 can be a custom made or commercially available processor, a central processing unit (CPU), an auxiliary processor among several processors associated with the computing device, a semiconductor based microprocessor (in the form of a microchip or chip set), or generally any device for executing software instructions.

In one example, the film layer 20 is comprised of a half silvered film, e.g. semi-transparent, for a front skin of the grille 14c that would have a chrome appearance. One example of such a film is manufacture by Kurz®. When used in a body panel 14a or bumper 14b, the foil or film can be formed to have a color that matches the color of the surrounding panel or bumper. The film layer 20 is formed and over-molded with the substrate layer 22, which comprises a clear plastic substrate that provides structural rigidity and allows light to pass through the silvered film layer 20. The film layer 20 and substrate layer 22 form the lens 18 through which the rays of light from the light source 16 are transmitted.

The structural support 30 is positioned behind the lens 18 and comprises a two shot structural support that includes at least the first structure 32 and second structure 34 which facilitate support of the light assembly 12 and attachment thereof to the vehicle member 14. In one example, the first structure 32 comprises a heat conductive plastic section that is positioned behind the PCB assembly 36 and the second structure 34 comprises a lower cost nylon structure that backs the entire lens 18 except in areas where the light passes through, i.e. areas associated with the light source 16 and the first structure 32.

In one example, the lens 18 and the structural support 30 are bonded together with adhesive. In one example, adhesive is used to seal a periphery of the light pass through area of lens 18 to the structural support 30 as indicated at 46. Additional adhesive is added across a rear surface of the clear plastic substrate layer 22, as indicated at 48, to increase stiffness and along an entire periphery of the structural support 30.

In one example, the light source 16 comprises one or more LEDs that are connected to the PCB assembly 36. The first structure 32 comprises heat conductive plastic that is located at a rear portion of the PCB assembly 36 to provide any heat sinking needed for the LEDs and to support any power supply circuitry to run the LEDs.

The LEDs shine through the clear plastic substrate layer 22 and semi-transparent film layer 20 which include a light optics area 50 that can be molded into the rear surface of the clear plastic in the light pass through area. The film layer 20 and clear plastic substrate layer 22 that form the lens 18 can be designed to allow projection of the light as needed for the selected tasks, e.g. day time lights and/or turn signals, and to provide sufficient light to meet the all lamp requirements and specifications. The light assembly 12 is made from individual pieces that are each flexible such that the assembly 12 allows an amount of flex similar to current parts used for trim purposes.

FIGS. 3A-3B show the lens 18 in greater detail. Depending on the impact requirements of the specific application, e.g. panel 14a, grille 14c, bumper 14b, etc., and a desired stiffness of the final assembly 12, a variety of clear substrate materials can be used for the substrate layer 22. In one example, a polycarbonate material is used because it has excellent impact properties, good heat resistance properties, and conventional injection molding can be used to mold the part. Optionally, if the assembly is located in an area that is not prone to impacts, a lower cost material such as acrylic or polypropylene can be used. However, if a flexible surface is desired for the substrate layer 22, a material such as silicone, for example, is preferred. When the lens 18 uses a silicone material, the over mold process of attaching the substrate layer 22 and film layer 20 would require a liquid injection molding method.

Figure 4A:
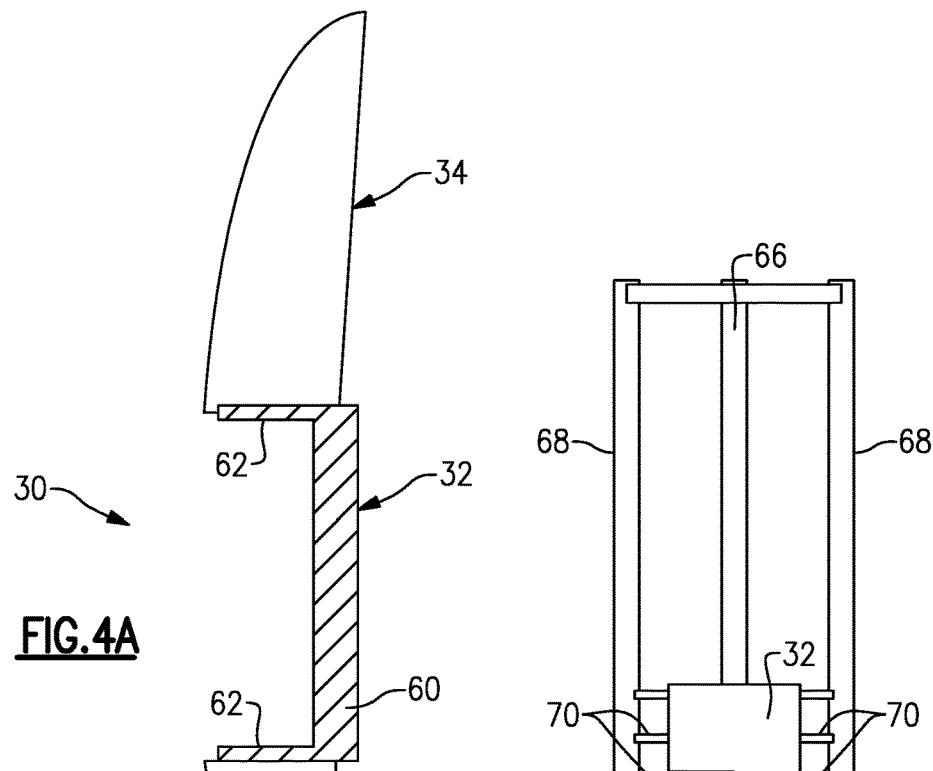
FIG. 4A is a schematic side view of a structural support from the light apparatus of FIG. 2, the structural support including a first portion associated with a light source and a second portion associated with a remaining portion of the lens.
Figure 4B:
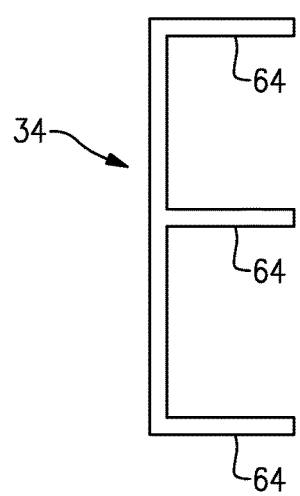
FIG. 4B is a section view of the second portion of FIG. 4A.
Figure 4C:
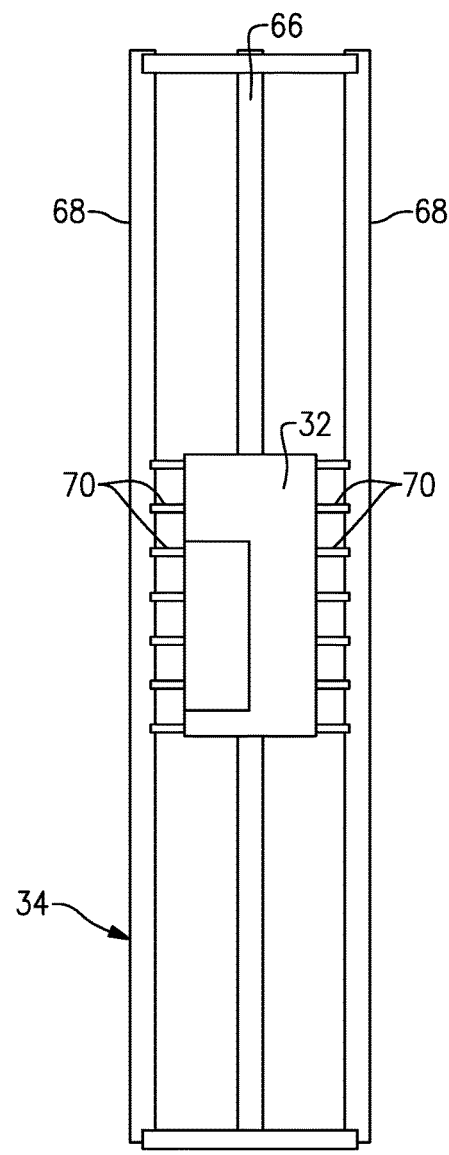
FIG. 4C is an end view of the structural support of FIG. 4A.

The structural support 30 is shown in greater detail in FIGS. 4A-C. As discussed above, the first structure 32 is positioned behind the light source 16 and associated lens area, and the second structure 34 is positioned behind the remaining portion of the lens 18. The first structure 32, in one example, is made from a heat conductive nylon plastic and comprises a heat sink for the high intensity LED lights to carry the heat away from the DRL and turn signal lights. The second structure is preferably made from a lower cost plastic material such as Nylon 6, for example.

A two shot molding process is used to form the structural support 30. As such, compatibility between the first and second shot is important. As the material for the first structure 32, it is preferred to use a polymer that is stiff with a high tensile strength, has good notched and un-notched impact strength, and which is compatible with nylon 6. In one example, Nylon 6/6 material is used for the first structure 32 because it has good stiffness properties, absorbs little moisture when compared to Nylon 6 and is compatible with other nylon materials. In one example, in order to meet stiffness requirements, 20% short fiber glass is added to the formulation. In one example, to improve impact, 5% maleic anhydride grafted polymer is added to the formulation. Maleic anhydride also functions to improve the compatibility of the two nylon materials in molding as maleic anhydride is known to enhance the compatibility of crystalline materials in two-shot molding.

In another example, the heat conductive material is polypropylene (PP) or silicone that has been modified by adding graphite to create a thermally conductive compound. The higher the aspect ratio, the less graphite is required to significantly improve both the electrical conductivity. Other forms and types of graphite, ceramics, metals, graphene or carbon black can also be used to improve the thermal conductivity of the polymer.

In one example, the final formulation resulting from the two shot molding process has a tensile strength of about 100 MPa. For comparative purposes, steel has a tensile strength over 500 MPa. Traditionally, the light assembly has been supported using a steel structure to achieve the desired stiffness and strength properties. As the plastic material used for the support structure 30 has a lower tensile strength than steel, to make up for this difference the geometry of the structure is enhanced by selectively reinforcing the structure with structural ribbing.

As discussed above, the backbone of the light assembly 16 is the support structure 30 which includes the first structure 32, comprising a heat conductive plastic section behind the LED flex circuit assembly 36, and the second structure 34 that comprises a lower cost nylon structure that backs the entire lens 18 except in the areas of light pass through. The first 32 and second 34 structures are shown in FIG. 4A. The first structure 32 is formed with a flat base 60 that supports the flexible PCB assembly 36 and which further includes side ribbing 62 that increases stiffness and protects the light source 16. Thus, the first structure 32 comprises a cup-shape component that is generally centrally located within the support structure 30.

The second structure 34 is molded around the first structure 32 and includes one or more structural ribs 64 (FIG. 4B). In one example shown in FIG. 4C, the second structure 34 includes a central rib 66 and two opposing side ribs 68. One or more additional reinforcing ribs 70 can also be provided where needed to increase stiffness and strength.

The subject invention forms a light assembly to have the appearance of a plastic molded bumper/grille skin, and can be made with the same concepts as a traditional grille assy. The same process can also be used to put the light assembly into colored body panels. Thus, the lights can be put in any desired location on the vehicle for aesthetic and functional purposes. The clear plastic substrate should pass light with little to no attenuation as it is water clear. Colored or chrome look films may require additional light generation to overcome the small attenuation resulting from the film color. The DRLs, turn signals, and other lights are not visible when in a "lights off" or deactivated condition. When in this condition, the lights look like normal trim (grill, bumper, etc.) or body panels. When activated in a "lights on" condition, the light shines through the colored or chrome-look film layer to provide normal lighting functions.

The subject light assembly also provides sufficient structural support for the film layer to react to forces or minor impact. Further, the structure of the bumper/grille/light assembly is designed to flex on impact. This is achieved by providing LEDs that are mounted on a flexible PCB assembly, a lens formed from a flexible material, and a flexible support structure with ribbing that provides additional bumper/grille structural strength. Also, ribbing around the light source provides additional structural strength to prevent damage to the lights. As such, the lights will move more as a unit rather than collapsing and damaging lamp electronics.

Further, by installing the lights in pockets in a surface/substrate configuration, reaction of blunt contact force is transferred from the surface to the bumper structure as needed for minor, e.g. <3 mph, impact. Hard plastics, such as polycarbonate for example, can be used to provide a firm feel while a transparent flexible silicone lens allows tailoring of light output and focus while allowing flexing of the underlying substrate. Also, the heat conductive plastic of the support structure helps manage heat from the LED lights and the drive/control circuitry so the lights do not overheat.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A light apparatus, comprising:
   a light surrounded by a vehicle member;
   a film on a substrate layer to form a lens for the light;
   a support comprising a first structure positioned behind the light and one portion of the lens and a second structure positioned behind a remaining portion of the lens; and
   a control to deactivate the light such that the light apparatus has a same appearance as the vehicle member.

2. The apparatus according to claim 1 wherein the light comprises at least one of a daylight running light and a turn signal.

3. The apparatus according to claim 1 wherein the first structure is comprised of a first material and the second structure is comprised of a second material different than the first material.

4. The apparatus according to claim 3 wherein the first material has a first heat conductivity and the second material has a second heat conductivity that is different than the first heat conductivity.

5. The apparatus according to claim 3 wherein the first material comprises a first nylon plastic and the second material comprises a second nylon plastic different than the first nylon plastic.

6. The apparatus according to claim 1 wherein the vehicle member comprises a grille, bumper, or body panel having a first color, and wherein the film comprises a second color that matches the first color.

7. The apparatus according to claim 6 wherein the substrate layer comprises a clear plastic layer that is attached to an exterior or interior surface of the film.

8. The apparatus according to claim 7 wherein the clear plastic layer comprises at least one of polycarbonate, polypropylene, acrylic, and silicone.

9. The apparatus according to claim 1 wherein the light comprises one or more light sources connected to a circuit assembly that is supported by the first structure.

10. The apparatus according to claim 9 wherein the control is connected to the circuit assembly, and wherein the control activates the light source to be visible and deactivates the light source such that the light apparatus blends in with the vehicle member.

11. A light apparatus, comprising:
    a daytime running light and turn signal assembly surrounded by a vehicle member, the assembly including lights, a film layer attached to a substrate layer to form a lens, and a structural support that supports the lens; and
    a control configured to deactivate the lights such that the assembly has a same appearance as the vehicle member.

12. The apparatus according to claim 11 wherein the vehicle member comprises a grille, bumper, or body panel having a first color, and wherein the film layer comprises a second color that matches the first color.

13. The apparatus according to claim 12 wherein the structural support comprises
    a first portion positioned behind the lights and one portion of the lens, and
    a second portion positioned behind a remaining portion of the lens.

14. The apparatus according to claim 13 wherein the first portion comprises a first plastic and the second portion comprises a second plastic different than the first plastic.

15. The apparatus according to claim 14 wherein the substrate layer comprises a clear plastic layer that is attached to an exterior or interior surface of the film layer.

16. The apparatus according to claim 13 wherein the lights are supported by the first portion, and wherein the control is configured to activate one or more of the lights to be visible in response to a turn signal request and/or during day time running light conditions.

17. A method, comprising:
    providing a daytime running light and turn signal assembly surrounded by a vehicle member;
    activating the assembly to provide a desired lighting function; and
    deactivating the assembly such that the assembly has a same appearance as the vehicle member.

18. The method according to claim 17 wherein the assembly includes lights, a film layer attached to a substrate layer to form a lens, and a structural support to support the lens, and including
    forming the vehicle member to have a first color and forming the film layer to have second color that matches the first color.

19. The method according to claim 18 including
    forming the structural support to have at least a first portion to be positioned behind the lights and one portion of the lens, and a second portion to be positioned behind a remaining portion of the lens, and
    using a first plastic material for the first portion and a second plastic material different than the first plastic material for the second portion.

20. The method according to claim 19 including using a two shot molding process to mold the first and second portions together to form the support structure.

* * * * *